Sept. 4, 1928.
M. I. KARN
1,683,041
FASTENER FOR SAFETY CALK WEBS
Filed April 9, 1928
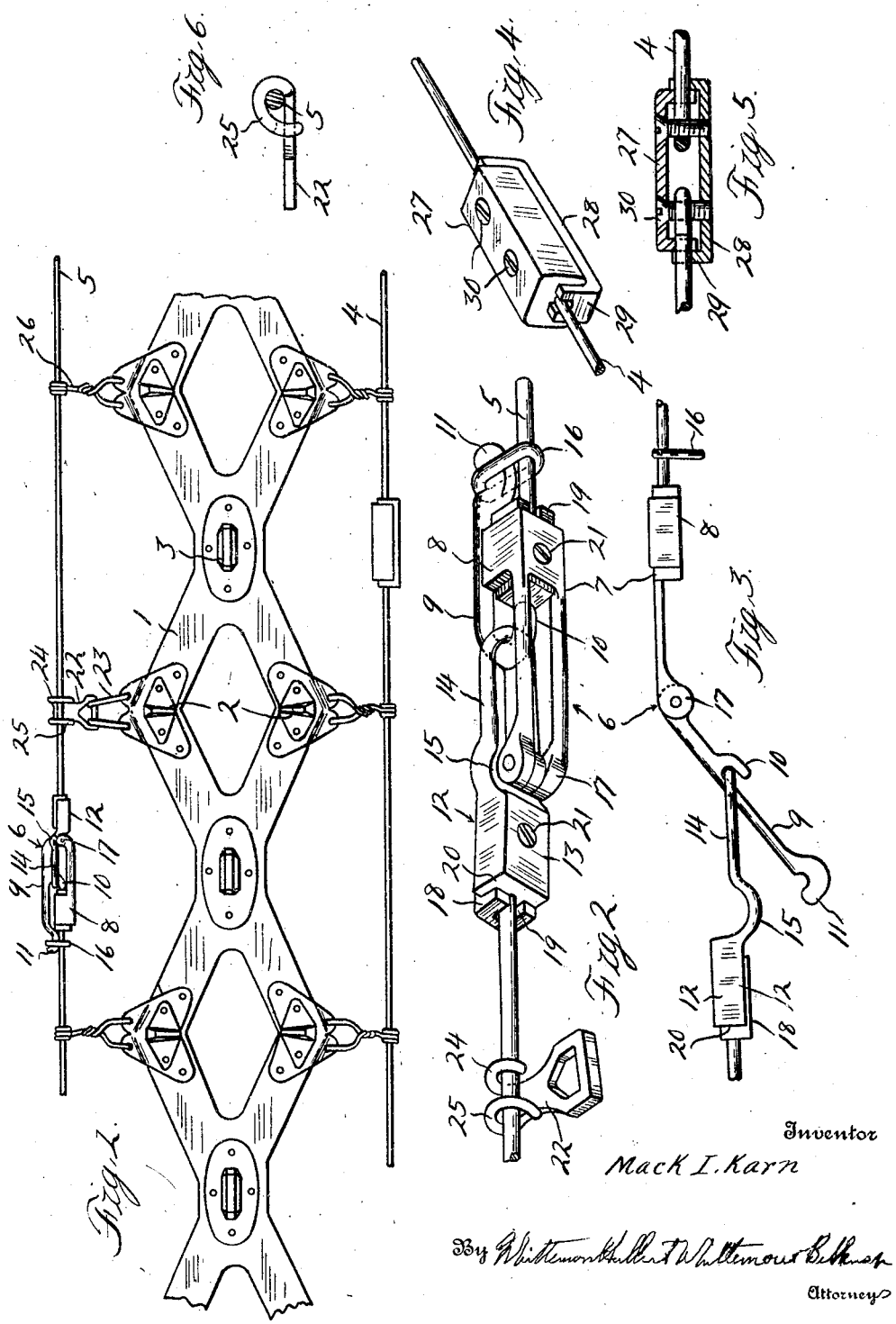
Inventor
Mack I. Karn
By Whittemore, Hulbert, Whittemore & Belknap
Attorneys Patented Sept. 4, 1928.

1,683,041

UNITED STATES PATENT OFFICE.

MACK I. KARN, OF PONTIAC, MICHIGAN.

FASTENER FOR SAFETY CALK WEBS.

Application filed April 9, 1928. Serial No. 268,651.

This invention relates generally to anti-skid devices and refers more particularly to fastening means for detachably securing anti-skid devices upon vehicle wheels.

An object of the present invention is to provide a fastener for anti-skid devices which is simple in construction, economical to manufacture and which may be easily and quickly actuated in removing and applying the anti-skid device to a vehicle wheel.

With the above and other objects in view the invention consists in certain novel features of construction, combinations and arrangements of parts as will be more fully described and particularly pointed out in the appended claims.

In the drawings:

Figure 1 is a view showing my fastener applied to an anti-skid device;

Figure 2 is an enlarged perspective view of the fastener in closed position together with the cable attaching plate;

Figure 3 is a view of the fastener in open position;

Figure 4 is a perspective view of the permanent fastener;

Figure 5 is a sectional view of the fastener shown in Figure 4; and

Figure 6 is an edge view of the cable attaching plate.

Referring now to the drawings and particularly to Figure 1 there is shown an anti-skid device comprising a safety calk web 1 composed of a flexible material such as rubber and being provided upon its outer surface with transverse and longitudinal calks 2 and 3 respectively which are so arranged as to prevent skidding in different directions. This safety web is adapted to encircle a vehicle wheel and is provided with side cables 4 and 5 respectively attached at spaced intervals to the web in any suitable manner.

In applying the web to a vehicle wheel, it is only necessary to provide means for detachably connecting the end portions of one of the cables and the end portions of the cable 4 are therefore permanently secured together in a manner to be hereinafter described. The cable 5 has inserted therein a fastener 6 which may be easily and quickly actuated for detaching the end portions of the cable in removing and applying the anti-skid device.

The fastener comprises a body member 7 which is provided at one end with a housing 8 adapted to receive and to securely clamp thereto one end of the cable 5. To the other end of the body member is pivotally connected a lever 9 provided intermediate its ends with a hook portion 10, said lever being adapted in its closed position to lie in close proximity to the body member and having its end portion 11 extending beyond the housing 8 as clearly shown in Figure 2.

To the other end of the cable 5 is secured a link member 12 provided with a housing 13 for receiving the other end of the cable and having its outer end portion formed into a loop 14 adapted to be slipped over the end portion 11 of the lever for engagement with the hook portion 10. This link member is provided intermediate its ends with a curved portion 15 adapted in operative position to bear against the end portions of the lever and body which tend to act as a pivot about which the link member partially moves.

A link 16 is loosely carried by the cable adjacent to the housing 8 and is adapted to engage the hook of the end portion 11 of the lever for retaining the parts in closed position. It will be noted that the hook portion 10 of the lever is positioned to one side of the pivot point 17 so that when the parts are in the position shown in Figure 2, there will be a tendency for the link member 12 to exert a pull upon the lever which will be transmitted to the end portion thereof and will tend to effect a binding action between the end of the lever, the cable, and the link 16, thereby preventing this link from slipping off the end of the lever. Because of the construction of the link member 12 this pull against the lever will be effective both when the curved portion 15 is in engagement with the pivot point 17, and when the link member is moved laterally thereof away from the body member during the rotation of the vehicle wheel. It is therefore apparent that the lever will be securely held in closed position and that the parts will be retained in the position shown in Figure 2 regardless of the movement of the link member relative to the lever and body member.

The means for clamping the ends of the cable in the housings 8 and 13 is substantially the same. In each instance the housing is provided with a cap or cover 18 provided with a downwardly extending slotted flange 19. The end wall 20 of each housing is also provided with a slot adapted to align with the slot of the cover for receiving the cable and permitting the end to pass within the housing. A screw 21 is adapted to extend transversely of the housing and to engage both the cover and the base of the housing, for clamping these two parts together and at the same time clamping the end portion of the cable between the slotted portions mentioned above. To further secure each cable end to its respective fastener element it is bent upon itself to form an eye through which the screw 21 is adapted to extend. This provides an efficient means for securing the members 7 and 12 to their respective ends of the cable.

In removing and applying the anti-skid device to a wheel it is necessary to provide means for permitting the end of the cable to which the link member is secured, to become sufficiently disengaged from the web 1 to prevent any binding of the parts during either of these operations. For taking care of this there is provided a plate 22 suitably secured by means of links 23 to the web. The end of this plate is formed into a pair of inwardly curved prongs 24 and 25 respectively through which the cable is adapted to pass. The prong 24 terminates short of the body of the plate while the prong 25 is extended past the body but spaced therefrom. The arrangement is such that when the cable is taut it will be securely retained in operative position by the plate in a manner similar to the usual fasteners 26. However when the cable is slack it can be easily disengaged from the plate by first slipping it out of the loop formed by the prong 24 and then twisting it out of the loop formed by the prong 25. Likewise in applying the device the cable may be inserted first into the loop formed by the prong 25 and then into the loop formed by the prong 24 and when the link member is secured in place and the cable is taut the plate will function to prevent disengagement of the cable therefrom.

For securing the end portions of the cable 4 together there is provided a housing 27 having its end walls slotted in a manner similar to the walls of the housings 8 and 13. A cap 28 is provided with slotted end flanges 29 which cooperate with the end walls of the housing to position the cable ends in the same manner as that described above. Screws 30 are provided for drawing the housing and cap together to clamp the cable ends therebetween and these ends are also provided with eyes through which the screws extend for additionally securing the ends in place.

It will be noted that when the lever is in closed position the end of the hook portion 10 is in close proximity to the end wall of the housing 8 so that there will be no possibility of the loop portion of the link member becoming disengaged from the hook portion. This is an added safety feature present, due to the novel arrangement of the several elements relative to one another.

From the foregoing, it will be apparent that I have provided an improved form of a fastening means for an anti-skid device which is easily and quickly actuated for fastening the device in operative position and for removing the same from a vehicle wheel.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What I claim as my invention is:

1. In a fastener for side cables of anti-skid devices, a body member secured to one end of a cable, a lever pivoted to said body and provided with a hook portion facing toward said body member and adapted to be positioned approximately midway of the body and lever when the lever is in closed position, a link member secured to the other end of the cable and adapted to be slipped over the end of the lever for engagement with the hook portion thereof, and means carried by the cable and engageable with the outer end of the lever for retaining the latter in closed position against the pull of said link member.

2. In a fastener for side cables of anti-skid devices, a body member secured to one end of a cable, a lever pivoted to said body, and provided with a hook portion facing toward said body member, and adapted to be positioned approximately midway of the body and lever when the lever is in closed position, a link member secured to the other end of the cable and adapted to be slipped over the end of the lever for engagement with the hook portion thereof, and a link loosely carried by the cable adjacent said body member and engageable with the end portion of said lever for retaining the latter in closed position against the pull of said link member.

3. In a fastener for side cables of anti-skid devices, a body member secured to one end of said cable, a lever pivoted to one end of said body member and adapted, when in closed position, to lie in close proximity to said body with its outer end adjacent said cable beyond the point of connection thereof with said body, said lever having a hook portion approximately midway of its ends, a link member secured to the other end of said cable and adapted to be slipped over said lever for engagement with said hook portion, and a link loosely carried by said cable adjacent said body member and engageable with the outer end portion of said lever for retaining the latter in closed position against the pull of said link member.

4. In a fastener of the class described, a body member having a housing for a flexible member such as a cable and having a pair of substantially parallel arms projecting from one end of said housing, a lever pivoted between said arms, and a link receiving hook projecting from said lever at a point remote from its pivot so as to open toward and terminate at end but be closed by the end aforesaid of said housing when said lever is in closed substantially parallel relation to said arms.

5. In a fastener of the class described, a body member having a housing for a flexible member such as a cable and having a projection at one end of said housing, a lever swingingly mounted upon said projection so as to be disposed substantially parallel to said body when in closed position, and a link receiving hook projecting from said lever at a point substantially midway of its ends opening toward and closed by a portion of said housing when said lever is in closed position as aforesaid.

6. In a fastener of the class described, a body member having cooperating sections for holding a flexible member such as a cable and having an arm projecting from one of said sections, a lever having an end pivoted upon said arm at one end thereof and adapted when in closed position to be substantially parallel to said arm, and a link receiving hook projecting from said lever at a point substantially midway of its ends and adapted when said lever is in closed position to be disposed at one side of and be closed by a section aforesaid of said body member.

7. In a fastener of the class described, a body member having a housing for a flexible member such as a cable and having an extension at one end of said housing, a lever pivoted upon said extension and adapted when in closed position to be substantially parallel to said extension, and a link receiving hook projecting from said lever at a point approximately midway of its ends and adapted when said lever is in closed position to be disposed between said lever and extension aforesaid, whereby a link engaging the hook would be pulled tight of the hook over said body member when the said lever is moved to closed position.

8. In a fastener of the class described, a body member having cooperating sections for holding a flexible member such as a cable and having a pair of arms projecting from one of said sections and provided at one end with pivot receiving portions, a pivot extending transversely of said pivot receiving portions, a lever carried by said pivot and adapted when in closed position to be substantially parallel to said body member, and a link receiving hook projecting from said lever at a point substantially midway of its ends and adapted when said lever is in closed position to be adjacent the other of the sections aforesaid.

In testimony whereof I affix my signature.

MACK I. KARN.